(No Model.)

C. L. SCOTT.
TANK VALVE.

No. 602,525. Patented Apr. 19, 1898.

Witnesses
John F. Senkerwied
V. B. Hillyard.

By his Attorneys,

Inventor
Charles L. Scott.

C. A. Snow & Co.

UNITED STATES PATENT OFFICE.

CHARLES L. SCOTT, OF McINTIRE, IOWA.

TANK-VALVE.

SPECIFICATION forming part of Letters Patent No. 602,525, dated April 19, 1898.

Application filed April 28, 1897. Serial No. 634,282. (No model.)

*To all whom it may concern:*

Be it known that I, CHARLES L. SCOTT, a citizen of the United States, residing at McIntire, in the county of Mitchell and State of Iowa, have invented a new and useful Tank-Valve, of which the following is a specification.

The object of this invention is to provide a valve for watering-troughs and tanks for stock for maintaining the water in the said troughs or tanks at a predetermined level and which will be of simple construction and effective for the purpose designed, the parts being separable and detachable to admit of repairs being economically and quickly made when desired.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
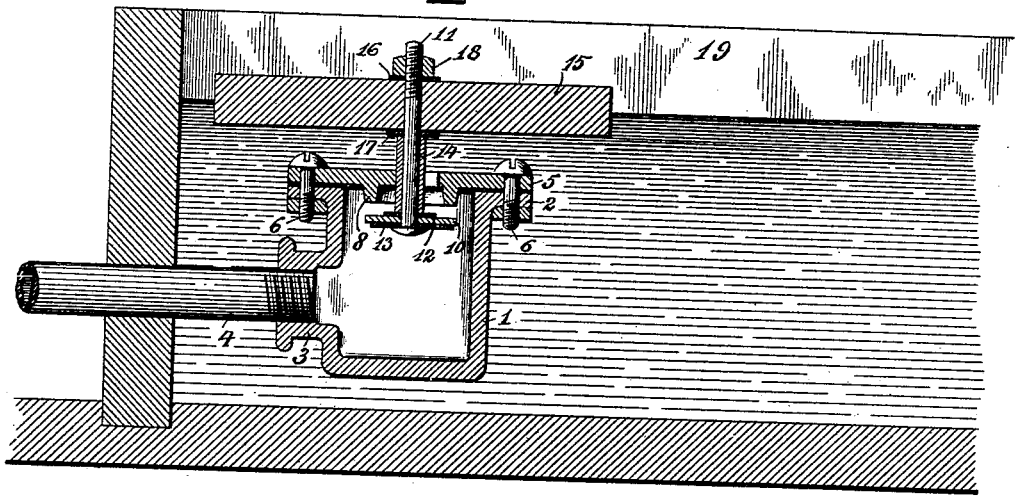
Figure 2:
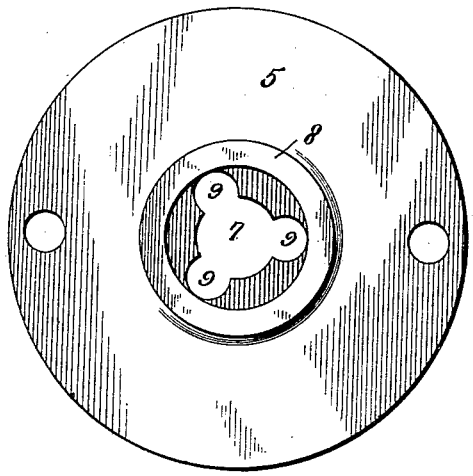
Figure 3:
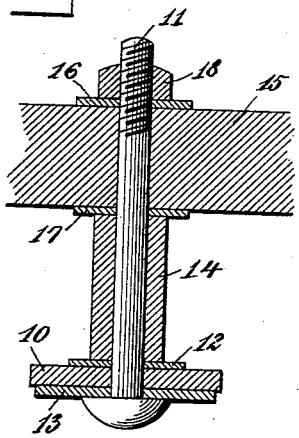

Figure 1 is a vertical central section of the improved valve, showing it in position. Fig. 2 is a view of the cap for closing the valve-casing as seen from the inner side. Fig. 3 is a detail view in section of the valve, its stem, and the adjunctive parts.

Corresponding and like parts are referred to in the following description and indicated in the several views of the drawings by the same reference characters.

The valve-casing 1 is open at its upper end and provided with an outer flange 2 and with an offstanding nipple 3, with which the supply-pipe 4 connects. A cap 5 closes the open end of the valve-casing and is held in place by bolts 6 or like fastenings passing through openings in the cap 5 and outer flange 2. This cap has a central opening 7 and an annular rib 8 on its inner side, forming a valve-seat and serving to strengthen and stiffen the cap and admit of it being made comparatively thin and light. A series of openings or notches 9 are provided at one side of the opening 7 and communicate therewith and serve as exits for the escape of the water from the valve-casing when the valve is unseated.

The valve 10 may be of leather, rubber, or other suitable material generally used for this purpose and is mounted upon a bolt or stem 11 between washers 12 and 13, of different sizes, the washer 12 being the smaller and of such relative size as to enter the space inclosed by the raised valve-seat 8. A spacing-sleeve 14 is slipped upon the stem 11 and engages at its lower end with the washer 12 and operates snugly within the opening 7, so as to guide the valve in its vertical movements. A float 15, of desired form and size, is secured to the upper end of the stem 11 between washers 16 and 17, the latter engaging with the upper end of the spacing-sleeve 14, and the several parts are held upon the stem or bolt 11 by means of a nut 18, mounted upon its threaded end.

The device is located in a tank or trough 19 and has connection with a suitable source of water-supply by means of the pipe 4, the float 15 being adjusted so as to seat the valve when the level of the water in the tank reaches the desired position. When the water recedes from any cause, the float settles and unseats the valve, thereby permitting the water to pass by the valve and out through the escape-openings 9 and into the tank, thereby replenishing the same to the extent of the amount removed either by evaporation, by the stock drinking, or from other cause. As the water rises in the tank the float ascends and the valve being connected therewith is lifted and settles against the seat 8, thereby shutting off the supply as soon as the predetermined water-line has been reached.

Having thus described the invention, what is claimed as new is—

1. In a valve for watering-troughs and stock-tanks, the combination of a casing having a raised valve-seat, a central guide-opening, and a series of escape-openings at the side of and communicating with the guide-opening, a valve for closing against the raised seat and having its stem operating in the guide-opening, and a float secured to the outer end of the valve-stem, substantially as set forth.

2. The herein-described valve for the purpose set forth, consisting of a casing having an offstanding nipple and open at its upper end, a cap secured to the open end of the casing and provided with a guide-opening and a series of discharge-openings at the side of and communicating with the guide-opening, and having a rib on its inner side, forming a raised valve-seat, a bolt or stem, a valve secured upon the stem between washers, a spacing-sleeve slipped upon the valve-stem and operating in the guide-opening of the cap, and a float secured upon the projecting end of the valve-stem between washers, substantially in the manner set forth.

In testimony that I claim the foregoing as my own I have hereto affixed my signature in the presence of two witnesses.

CHARLES L. SCOTT.

Witnesses:
   H. M. BABCOCK,
   F. L. ANDERSON.